United States Patent
Gudme et al.

(10) Patent No.: US 9,188,254 B2
(45) Date of Patent: Nov. 17, 2015

(54) UNBONDED FLEXIBLE PIPE (75) Inventors: Jonas Gudme, Humlebaek (DK); Karsten Gorm Nielsen, Allerød (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 88 days.

(21) Appl. No.: 13/980,659

(22) PCT Filed: Jan. 13, 2012

(86) PCT No.: PCT/DK2012/050015
§ 371 (c)(1),
(2), (4) Date: Sep. 19, 2013

(87) PCT Pub. No.: WO2012/097817
PCT Pub. Date: Jul. 26, 2012

(65) Prior Publication Data
US 2014/0000748 A1    Jan. 2, 2014

(30) Foreign Application Priority Data
Jan. 20, 2011   (DK) .................................. 2011 00037

(51) Int. Cl.
*F16L 11/16* (2006.01)
*F16L 11/00* (2006.01)
*F16L 11/08* (2006.01)

(52) U.S. Cl.
CPC ................ *F16L 11/00* (2013.01); *F16L 11/082* (2013.01); *F16L 11/16* (2013.01)

(58) Field of Classification Search
CPC .......... F16L 11/083; F16L 11/16; F16L 11/24
USPC ............................ 138/134–136, 138–140, 131
See application file for complete search history.

(56) References Cited

U.S. PATENT DOCUMENTS

| 5,213,637 A | 5/1993 | Mallen Herrero |
| 5,275,209 A * | 1/1994 | Sugier et al. .................. 138/135 |

(Continued)

FOREIGN PATENT DOCUMENTS

| EP | 1475560 A1 | 11/2004 |
| WO | 01/61232 A1 | 8/2001 |

(Continued)

OTHER PUBLICATIONS

"Recommended Practice for Flexible Pipe" ANSI/API Recommended Practice 17B Fourth Edition, Jul. 2008.

(Continued)

*Primary Examiner* — Patrick F Brinson
(74) *Attorney, Agent, or Firm* — Pearne & Gordon LLP (57) ABSTRACT

An unbonded flexible pipe for transportation of fluids and comprising a tubular inner sealing sheath defining a bore. At least one armor layer surrounds the inner sealing sheath and a carcass is arranged in the bore to support the inner sealing sheath. The carcass comprises at least one profiled elongate element, which is helically wound to form directly and/or indirectly engaging elongate element windings along the length of the pipe. The carcass provides a quasi fluid permeable inner wall of the bore with discontinuities between successive turns of the wound elongate element(s). The discontinuities have an average width in the axial direction of the pipe which is about 3 mm or less when the pipe is in an unloaded and unbent condition, and the pipe can bend with a minimum bending radius of about 10 m or less in an unloaded condition.

24 Claims, 7 Drawing Sheets

(56) References Cited

U.S. PATENT DOCUMENTS

| | | | |
|---|---|---|---|
| 5,406,984 A * | 4/1995 | Sugier et al. | 138/135 |
| 5,407,744 A | 4/1995 | Mallen Herrero | |
| 5,669,420 A * | 9/1997 | Herrero et al. | 138/135 |
| 5,922,149 A | 7/1999 | Mallen Herrero | |
| 6,065,501 A | 5/2000 | Feret | |
| 6,085,799 A | 7/2000 | Kodaissi | |
| 6,123,114 A | 9/2000 | Seguin | |
| 6,145,546 A | 11/2000 | Hardy | |
| 6,253,793 B1 | 7/2001 | Dupoiron | |
| 6,282,933 B1 | 9/2001 | Dupoiron | |
| 6,283,161 B1 | 9/2001 | Feret | |
| 6,291,079 B1 | 9/2001 | Mallen Herrero | |
| 6,354,333 B1 | 3/2002 | Dupoiron | |
| 6,408,891 B1 | 6/2002 | Jung | |
| 6,415,825 B1 | 7/2002 | Dupoiron | |
| 6,550,502 B2 * | 4/2003 | Odru | 138/135 |
| 6,668,867 B2 * | 12/2003 | Espinasse et al. | 138/135 |
| 6,739,355 B2 * | 5/2004 | Glejbøl et al. | 138/135 |
| 6,840,286 B2 * | 1/2005 | Espinasse et al. | 138/135 |
| 6,889,717 B2 | 5/2005 | Coutarel | |
| 6,889,718 B2 * | 5/2005 | Glejbøl et al. | 138/135 |
| 6,904,939 B2 | 6/2005 | Jung | |
| 6,981,526 B2 | 1/2006 | Glejbol | |
| 7,311,123 B2 * | 12/2007 | Espinasse et al. | 138/135 |
| 7,318,454 B2 | 1/2008 | Dupoiron | |
| 7,459,033 B2 | 12/2008 | Asahi | |
| 2003/0070719 A1 * | 4/2003 | Espinasse et al. | 138/109 |
| 2004/0060610 A1 | 4/2004 | Espinasse | |
| 2004/0154677 A1 * | 8/2004 | Coutarel et al. | 138/135 |
| 2008/0283138 A1 * | 11/2008 | Rytter | 138/133 |
| 2010/0089478 A1 * | 4/2010 | Gudme | 138/104 |

FOREIGN PATENT DOCUMENTS

| | | |
|---|---|---|
| WO | 2006/097112 A1 | 9/2006 |
| WO | 2008/077409 A1 | 7/2008 |

OTHER PUBLICATIONS

"Specification for Unbonded Flexible Pipe", API, 17J, third edition, Jul. 2008.

DK-PTO search report and opinion of Feb. 9, 2011.

Supplementary European Search Report for 12 73 7012 dated Mar. 2, 2015.

* cited by examiner

UNBONDED FLEXIBLE PIPE

TECHNICAL FIELD

The invention relates to a flexible pipe for transportation of fluids in offshore applications and in particular for transportation of gas containing fluids such as hydrocarbons.

BACKGROUND ART

Flexible pipes of the present type for offshore transportation of fluids are well known in the art. Such pipes usually comprise an inner liner also often called an inner sealing sheath or an inner sheath, which forms a barrier against the outflow of the fluid which is conveyed through the pipe, and one or more armoring layers on the outer side of the inner liner (outer armoring layer(s)). An outer sheath may be provided with the object of forming a barrier against the ingress of fluids from the pipe surroundings to the armor layers.

Typical unbonded flexible pipes are e.g. disclosed in WO0161232A1, U.S. Pat. No. 6,123,114, U.S. Pat. No. 6,085,799 and in Recommended Practice for Flexible Pipe, API, 17B, Fourth edition, July 2008, and in Specification for Unbonded Flexible Pipe, API, 17J, Third edition, July 2008.

The term "unbonded" means in this text that at least two of the layers including the armoring layers and polymer layers are not bonded to each other. In practice the known pipe normally comprises at least two armoring layers located outside the inner sealing sheath. These armoring layers are not bonded to each other directly or indirectly via other layers along the pipe. Thereby the pipe becomes bendable and sufficiently flexible to roll up for transportation.

In order to have sufficient strength, in particular to prevent the collapse of the inner sealing sheath, the flexible pipe often comprises an armor layer located inside the space defined by the inner sealing sheath. Such inner armoring layer or layers are normally referred to as a carcass. An unbounded flexible pipe with a carcass is usually referred to as a rough bore pipe. The prior art carcasses are usually made from helically wound and interlocked metal strips, such as for example described in U.S. Pat. No. 6,904,939 and U.S. Pat. No. 6,145,546. However, also the use of profiled elongate elements in a carcass has been suggested in EP 1 475 560 and WO 2008/077409 by the assignee.

However, the carcass in a rough bore pipe often provides an undesirable high resistance to fluid flowing in the bore of the pipe and thereby results in an undesired high loss of pressure along the length of the pipe, in particular when compared with smooth bore, unbonded flexible pipes which do not comprise a carcass.

Furthermore a problem has arisen when using rough bore flexible pipes for producing and exporting gaseous hydrocarbons. This problem has shown to be associated with the flow of gas or fluid containing gas in the rough bore pipe and more specifically with the phenomena of the formation of vortices which occur upon contact with the discontinuities between the turns of the carcass, which results in flow induced pressure pulsations (FIP) from the flexible pipes carcass.

The pulsation induced vibration forces acting on the pipes may lead to damaging vibrations and noise and in particular damage due to vibrations at the ends of the pipe and its connection to stationary structure problems often occur. Such damage may eventually result in leaks.

In U.S. Pat. No. 7,318,454 this problem has been alleviated by providing the rough bore pipe with an anti turbulence sheath which is placed on the inner side of the carcass and which is pierced with holes that are intended to oppose turbulence of the fluid flowing in the pipe.

The object of the invention is to provide a flexible unbonded pipe with a strength comparable to the strength of flexible unbonded pipes of the rough bore type but where the problem related to the undesired high resistance and/or formation of vortices as described above has been reduced in a simple and cost effective way. The inventor of the present invention has found an alternative solution to the problem which has shown to be surprisingly effective and simultaneously be relatively simple and cost effective to provide.

DISCLOSURE OF INVENTION

The flexible pipe of the invention is as defined in the claims and as described in the following.

The unbonded flexible pipe of the invention has been found to be highly beneficial and accordingly the unbonded flexible pipe in at least one embodiment of the invention results in a reduced pressure loss compared with prior art rough bore unbonded flexible pipe. When used for example in production of crude oil or other hydrocarbon containing fluids from the underground, the unbonded flexible pipe of the invention in at least one embodiment results in an increased oil production per hour or in than a flexible unbonded pipe with a smaller bore diameter can be applied than when using traditional rough bore unbonded flexible pipes.

The solution of the invention provided by the inventor does therefore not only provide an alternative solution for reduction of vortices, but it provides a solution which has shown to be surprisingly effective and simultaneously be relatively simple and cost effective to provide, and further more may result in an increased production rate.

The unbonded flexible pipe of the invention is particularly suitable for transportation of fluids e.g. between sub sea installations, from a well production to a surface installation and or any other offshore transportations of gas containing fluids.

The benefit of the unbonded flexible pipe of the invention relating to reduction of risk of forming vortices is particularly exploited when the unbonded flexible pipe is applied for transportation of gas containing fluids e.g. between sub sea installations, from a well production to a surface installation and or any other offshore transportations of gas containing fluids.

The unbonded flexible pipe has a length and comprises a tubular inner sealing sheath which defines the bore of the pipe in which the gas containing fluid is to be transported. The unbonded flexible pipe has a center axis along the length of the pipe. In most situations the pipe will have a substantially circular cross-section but it may also have other shapes such as oval. The unbonded flexible pipe comprises at least one armor layer surrounding the inner sealing sheath and a carcass arranged in the bore and supporting the inner sealing sheath. The carcass in the unbonded flexible pipe of the invention is the innermost layer of the pipe. It should be noted that the carcass does not provide a sealing for the fluid transported in the bore, but is permeable to the fluid and preferably permeable to liquid. The carcass comprises at least one profiled elongate element, helically wound to provide elongate element windings along the length of the pipe. The profile of the at least one elongate element is such that the elongate element windings engage with adjacent elongate element windings directly and/or indirectly.

The term "in radial direction" means a direction from the axis of the pipe and radially outwards.

The terms "inside" and "outside" a layer of the pipe are used to designate the relative distance to the axis of the pipe, such that inside a layer means the area encircled by the layer i.e. with a shorter axial distance than the layer and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The term "directly engaging" means that the adjacent elongate element windings engage directly with each other and the term "indirectly engaging" means that the adjacent elongate element windings are held together by one or more other elements—e.g. one or more additional elongate element(s) and/or one or more elongate element section(s) such as one or more C-shaped clips. The additional elongate element(s) may or may not be profiled. In one preferred embodiment comprising additional elongate element(s), the additional elongate element(s) is/are profiled. The profiled elongate element(s) is/are helically wound with a winding angle to the center axis which is relatively high in order to ensure a high collapse strength. Generally it is desired that the profiled elongate element(s) is/are helically wound with a winding angle to the center axis which is of at least about 80 degrees. The wound profiled elongate element(s) provides a quasi fluid permeable inner wall of the bore with discontinuities between successive turns of the wound profiled elongate elements.

The discontinuities have an average width in the axial direction of the pipe which is about 3 mm or less when the pipe is in an unloaded and unbent condition, and the number of discontinuities is sufficient to allow the pipe to bend with a minimum bending radius (MBR) of about 10 m or less, when the pipe is in an unloaded condition.

The minimum bending radius corresponds to the storage MBR referred to in Recommended Practice for Flexible Pipe, API, 17B, Fourth edition, July 2008.

In one embodiment the discontinuities have an average width in the axial direction of the pipe which is about 2 mm or less when the pipe is in an unloaded and unbent condition.

The unbonded flexible pipe is simple to produce, and no extra layer needs to be applied on the inner side of the carcass. It has been found that the carcass of the unbonded flexible pipe of the invention further provides the unbonded flexible pipe with a high collapse strength and simultaneously allows the unbonded flexible pipe to have a high flexibility. The quasi fluid permeable inner wall of the bore of the unbonded flexible pipe of the invention has been found to be comparable to the inner wall of a smooth bore pipe (a pipe without a carcass), with respect to low risk of formation of vortices.

Further more the quasi fluid permeable inner wall of the bore if the unbonded flexible pipe of the invention has been found to have a surprisingly beneficial influence on the velocity of a fluid transported in the unbonded flexible pipe as compared with traditional rough bore unbonded flexible pipes.

The one or more profiled elongate element(s) each has a bore surface facing the bore and which is a part of the quasi fluid permeable inner wall of the bore.

The one or more profiled elongate element(s) each has a width WW, which is determined as the cross sectional width of the of bore surface of the profiled elongate element.

Generally it is desired that each profiled elongate element has a consistent width along its length. If there are two or more profiled elongate elements they may have equal or different width.

The discontinuities each has a width DW determined in the axial direction of the pipe.

The relatively width WW of the respective profiled elongate element and width DW of the discontinuities has shown to be relevant for the resulting properties of the unbonded flexible pipe of the invention, in particular with respect to low risk of formation of vortices.

In one embodiment of the unbonded flexible pipe of the invention, a plurality of the discontinuities each has a width DW which relative to a width WW of the widest of the immediately adjacent profiled elongate element(s) in axial direction fulfill the formula $$WW/DW > X,$$

where X is about 3 or larger.

In one embodiment X is about 4 or larger, such as about 5 or larger, such as about 6 or larger, such as about 7 or larger, such as about 8 or larger.

In general it is in one embodiment desired that X is between about 3 and about 20, such as between about 5 and about 15, such as between 7 and about 10. If X is too large it may be difficult to simultaneously obtain a desired high flexibility, whereas if X is too low the reduction of risk of formation of vortices is not optimal.

Accordingly it has been found that the selection of the optimal value for X depend on the required or desired flexibility of the pipe, but also it has been found that the velocity of the fluid transported in the pipe may have an influence on the optimal value for X. Further more, if the carcass comprises profiled elongate elements of different width, the value X which is based on the largest width of immediately adjacent profiled elongate elements can be selected to be relatively high while still maintaining the unbonded flexible pipe relatively flexible.

In one embodiment of the unbonded flexible pipe of the invention the quasi fluid permeable inner wall of the bore, for a plurality elongate element windings along the length of the pipe, with an elongate element winding width WW1 in axial direction of the pipe, comprises at least one discontinuity with a width DW1 in the axial direction of the pipe fulfill the formula $$WW1/DW1 > X1,$$

where X1 is between about 3 and about 12, such as between about 5 and about 11, such as between 7 and about 10.

Preferably the at least one discontinuity with a width DW1 in the axial direction of the pipe is placed immediately adjacent to the elongate element windings along the length of the pipe with the width WW1 in axial direction of the pipe.

The immediately adjacent profiled elongate element or the immediately adjacent elongate element windings means herein the profiled elongate element(s) respectively the elongate element windings between which the discontinuity in question is formed.

If it is desired to have an unbonded flexible pipe which can be bent to have a relatively low bending radius, the number of the discontinuities is increased instead of increasing the width of the discontinuities. Thereby both a low bending radius and a quasi fluid permeable inner wall can be obtained simultaneously. The number of the discontinuities may for example be increased by providing that every second elongate element windings have a relatively small width, and the other every second elongate element windings have a larger width, such that the X/X1 values are maintained at a desired level.

In one embodiment the number of discontinuities is sufficient to allow the pipe to bend with a minimum bending radius of about 8 m or less. In most situations such minimum bending radius is sufficient. However, the number of discontinuities may be selected to be sufficient to allow the pipe to bend with a minimum bending radius of about 7 m or less, such as with a minimum binding radius of about 6 m or less, such as with a minimum binding radius of about 5 m or less, such as with a minimum binding radius of about 4 m or less, such as with a minimum binding radius of about 3 m or less.

The minimum bending radius is determined when the pipe is in an unloaded condition, i.e. the pressure in the bore of the pipe and outside the pipe is about 1 atm.

The minimum bending radius may be substantially identical along the length of the pipe. Normally the pipe will be simpler to produce with the discontinuities substantially identical along the length of the pipe.

In one embodiment the discontinuities are equally distributed along the length of the pipe.

In one embodiment the discontinuities are locally unevenly distributed along the length of the pipe, such that the number of discontinuities within a length section of about 5 m of the unbonded flexible pipe is substantially constant along the length of the pipe, whereas the distance between the discontinuities is not equidistant. In one embodiment the quasi fluid permeable inner wall comprises a plurality of discontinuity distances which each is a distance between two adjacent discontinuities, and at least about 10%, such as at least about 25%, such as about 50% of the discontinuity distances is different from the remaining of the discontinuity distances within a length section of for example about 5 m of the unbonded flexible pipe.

This variation in discontinuity distances has shown to provide an additional decrease in risk of formation of vortices.

In one embodiment the width of the discontinuities is substantially identical along the length of the pipe.

However, by varying the discontinuities along the length of the pipe the flexibility and/or minimum bending radius may be varied as well.

In one embodiment the discontinuities along the length of the pipe allow the pipe to bend with a minimum bending radius which is smaller in one length section of the pipe than in another length section of the pipe. Thereby the unbonded flexible pipe of the invention can have two or more pipe length sections with different minimum bending radius. The pipe can for example be constructed such that is suitable for a riser and has a first top length section connected to a platform or a vessel, which riser top length section has a first minimum bending radius, and where the riser has a lower length section with a second minimum bending radius and which riser lower length section is adapted to be arranged with one or more catenary curves near the seabed, and where the first minimum bending radius is larger than the second minimum bending radius.

In one embodiment the number of discontinuities in one length section of the pipe is higher than in another length section of the pipe.

In one embodiment the width in axial direction of the pipe between adjacent discontinuities varies along the length of the pipe. Preferably the width in the axial direction of the pipe between adjacent discontinuities varies along the length of the pipe in at least one length section of the pipe.

Care should be taken not to make any individual discontinuities too large as this may increase the risk of formation of vortices. Generally, it is desired not to make any individual discontinuities larger than about 3 mm when the pipe is in an unloaded and unbent condition.

In one embodiment substantially all of the discontinuities have a width in the axial direction of the pipe which is about 2 mm or less, such as 1.5 mm or less when the pipe is in an unloaded and unbent condition.

In one embodiment the elongate element windings engage with adjacent elongate element windings in a direction substantially perpendicular to radial direction, to thereby reduce or prevent radial displacement of the elongate element windings relative to adjacent elongate element windings.

In this embodiment the term "substantially perpendicular" means +/−about 10 degrees.

The carcass may for example be as the pressure armor described in U.S. Pat. No. 6,516,833, with the difference that the armor layer is placed on the inside of the inner sealing sheath and that the carcass has a quasi fluid permeable inner wall as described above.

In a preferred embodiment—and for providing high strength and low risk of undesired increase of discontinuities during use of the unbonded flexible pipe—it is desired that substantially all of adjacent elongate element windings engage with each other in a direction substantially perpendicular to radial direction, to thereby reduce or prevent radial displacement of the elongate element windings relative to adjacent elongate element windings.

However, in an alternative embodiment not all of the adjacent elongate element windings engage with each other in a direction substantially perpendicular to radial direction. In one at least about 50%, such as at least about 80%, such as substantially all of adjacent elongate element windings engage with each other in a direction substantially perpendicular to radial direction.

In one embodiment at least some of the elongate element windings do not engage with at least one adjacent elongate element winding in a substantially radial direction, preferably at least 10% of adjacent elongate element windings are not engaged with each other in a substantially radial direction.

The term "substantially radial direction" means +/−about 10 degrees.

In one embodiment at least some of the elongate element windings engage with at least one adjacent elongate element winding in a substantially radial direction, preferably at least 10% of adjacent elongate element windings, such as at least 50% of adjacent elongate element windings, such as at least 70% of adjacent elongate element windings, such as at least 90% of adjacent elongate element windings, such as substantially all of the adjacent elongate element windings are engaged with each other in a substantially radial direction.

As mentioned above the carcass has an inner side in the form of the quasi fluid permeable inner wall of the bore. The carcass further has an opposite outer side facing towards the inner sealing sheath. In one embodiment where the adjacent elongate element windings are engaged with each other in a substantially radial direction, the engagements in radial direction are placed closer to the quasi fluid permeable inner wall of the bore than to the outer side of the carcass. Preferably the engagements in radial direction are placed immediately adjacent to the quasi fluid permeable inner wall of the bore than to the outer side of the carcass.

This embodiment allows the windings to separate slightly from adjacent windings at the outer side of the carcass, when the pipe is subjected to excessive bending, while still ensuring that the windings do not separate substantially from adjacent windings at the quasi fluid permeable inner wall of the bore.

In one embodiment the outer site of the carcass comprises outer discontinuities provided between successive turns of the wound profiled elongate elements, and the outer discontinuities have an average width in the axial direction of the pipe which is similar to or larger than the average width in the axial direction of the discontinuities of the quasi fluid permeable inner wall of the bore when the pipe is in an unloaded and unbent condition.

As mentioned above the elongate element windings may engage directly and/or indirectly with adjacent elongate element windings.

In one embodiment at least some such as at least about 50% of the elongate element windings engage directly with adjacent elongate element windings. Generally it can be said that the higher the percentage is of the elongate element windings that engage directly with adjacent elongate element windings, the simpler it will be to produce the carcass.

In one embodiment all of the elongate element windings engage directly with adjacent elongate element windings.

In one embodiment at least some such as at least about 50% engage indirectly with adjacent elongate element windings. The elongate element windings may engage both directly and indirectly in which case they will have at least two engaging points. In one embodiment all of the elongate element windings engage indirectly with adjacent elongate element windings. The carcass may for example comprise non-armoring elongate elements wound adjacent to armoring profiled elongate elements and shaped to engage such armoring profiled elongate elements to form adjacent elongate element windings. The non-armoring elongate element(s) may preferably be profiled elongate element(s). The non-armoring elongate element(s) can for example be locking elements, C clips, and/or elastic element. Non-armoring elongate element(s) in the form of locking elements or C clips will generally not form part of the quasi fluid permeable inner wall.

In one embodiment the carcass comprises at least one profiled elongate element in form of an armoring profiled elongate element. The armoring profiled elongate element is preferably a wire.

In one embodiment all of the profiled elongate elements are wires.

In one embodiment the carcass comprises at least one profiled elongate element in form of a wire and at least one profiled elongate element of a non-metal material. The profiled elongate element of non-metal material is for example a non-armoring profiled elongate element. A non-armoring profiled/non-profiled elongate element is an element which does not provide any collapse resistance to the carcass as a whole but which merely has the function of holding and/or supporting profiled elongate element with armoring effect.

In one embodiment the carcass comprises at least one profiled elongate element in form of a wire of a first metal and at least one profiled elongate element of a second metal. The first and the second metal may for example differ from each other in strength and/or elasticity.

In one embodiment the first and the second metal are steel respectively aluminum. In order to reduce the risk of galvanic corrosion the profiled elongate element(s) of steel and/or the profiled elongate element(s) of aluminum is/are coated with an non-metal coating, such as a polymer. Alternatively an offer anode is placed in the carcass structure.

In one embodiment the first and the second metal are two different steel grades, such as two different grades of duplex steel.

In one embodiment the carcass comprises at least one profiled elongate element in form of a wire of a metal, such as steels, aluminum or titan and at least one profiled elongate element of a non-metal material, wherein the non-metal material is or comprises a polymer. For example the non-metal material is a composite material comprising fiber reinforced polymer. In one embodiment the non-metal material is a rubber. In one embodiment the non-metal material is a thermoplastic material. In one embodiment the non-metal material is an elastomer.

It has been found that a number of prior art profiled elongate elements, which heretofore were used for the production of pressure armoring layers of flexible pipes can be used in the production of the carcass of the unbonded flexible pipe of the invention provided that they are modified such that the discontinuities along the length of the pipe are sufficiently small to provide the carcass with a quasi fluid permeable inner wall as described above.

Examples of prior art profiled elongate elements, which may be used in the production of the carcass of the unbonded flexible pipe of the invention in a modified form include elongate elements with profiles as described in any one of U.S. Pat. No. 6,354,333, U.S. Pat. No. 6,253,793, U.S. Pat. No. 6,415,825, U.S. Pat. No. 6,889,717, U.S. Pat. No. 6,981,526 and EP 1 475 560

In one embodiment the profiled elongate element(s) comprises one or more of an angular profile, C shaped profile, a U shaped profile, a T shaped profile, an I shaped profile, a K shaped profile, a Z shaped profile, an X shaped profile, a ψ (psi) shaped profile and combinations thereof.

In one embodiment the carcass comprises at least one profiled elongate element with a first and a second edge, which first and second edges face adjacent elongate element windings, the first and second edges each having a protruding part and/or a recess.

The quasi fluid permeable inner wall is preferably as smooth as possible. However, it has been found that if the discontinuities have an average width in the axial direction of the pipe which is about 2 mm or less and all of the individual discontinuities have an average width in the axial direction of the pipe which is about 3 mm or less when the pipe is in an unloaded and unbent condition, the risk of formation of vortices will be negligible in most situations.

In one embodiment the quasi fluid permeable inner wall of the bore is essentially smooth except for the discontinuities between successive turns of the wound profiled elongate elements.

The term "essentially smooth" means herein substantially free of cavities and protrusions which are visible by the average eye.

Preferably the quasi fluid permeable inner wall of the bore is essentially smooth except for the discontinuities between successive turns of the wound profiled elongate elements.

In one embodiment the quasi fluid permeable inner wall of the bore is essentially smooth except for the discontinuities between successive turns of the wound elongate elements and sound damping tops and/or cavities with a width in the axial direction of the pipe which is about 2 mm or less.

In one embodiment the carcass comprises at least one profiled elongate element with a thickness determined in the radial direction of the pipe and an inner surface facing the bore. The inner surface comprises a plurality of cavities with a depth of up to about 50% of the thickness of the elongate element. Preferably the depth of the cavities is about 2 mm or less, such as about 1 mm or less. The depth of the cavities e.g. in the form of slits, should preferably be rather thin, such as with a maximal width of about 1 mm. The cavities may have the function of damping already formed vortices and/or reduce the risk of forming vortices.

In one embodiment the carcass comprises at least one profiled elongate element with a thickness in the radial direction of the pipe and an inner surface facing the bore, and the inner surface comprises a plurality of tops with a height of about 2 mm or less, such as about 1 mm or less.

The tops and/or cavities may for example be point wise and/or in the form of slits/ridges.

Since the tops and/or cavities simultaneously may provide resistance to a fluid flow in the bore of the pipe, the number/amount of tops and/or cavities should preferably be kept at a relatively low level, and preferably the tops and/or cavities are placed in some length sections of the pipe but not in the whole length of the pipe.

In one embodiment the carcass comprises at least one profiled elongate element with an inner surface facing the bore, and the inner surface comprises a plurality of tops and/or cavities, wherein the distance between tops and/or cavities having a height/depth of 0.5 mm or more is at least about 5 mm, such as at least about 10 mm. Preferably the distance between tops and/or cavities having a height/depth of 0.5 mm or more is at least about 5 mm, such as at least about 10 mm.

In one embodiment the quasi fluid permeable inner wall of the bore is essentially smooth except for the discontinuities between successive turns of the wound elongate elements and sound damping tops and/or cavities with a width in the axial direction of the pipe which is about 2 mm or less and a height/depth which is about 0.5 mm or more, wherein the unbonded flexible pipe comprises a relatively low roughness length section and a relatively high roughness length section, wherein the relatively high roughness length section comprises more, such as at least about 50% more, such as at least about 5 times as many sound damping tops and/or cavities than the relatively low roughness length section.

By having the main part of the tops and/or cavities located in high roughness length sections, such as for example length sections of the unbonded flexible pipe with a length of from about 5 to about 20 m, separated by low roughness length section of the unbonded flexible pipe, such as low roughness length section of the unbonded flexible pipe of at least about 20 m, such of at least about 50 m, a relatively low flow resistance is provided and simultaneously the sound damping tops and/or cavities reduce the risk of damage due to a vortices effect.

In one embodiment the quasi fluid permeable inner wall of the bore is provided by an inner surface of at least one profiled elongate element and the discontinuities between successive turns of the wound elongate element(s), the unbonded flexible pipe comprises a relatively low roughness length section and a relatively high roughness length section, wherein the relatively high roughness length section has a higher RMS (Root Mean Square) roughness, such as at least about 50% higher, such as at least about 5 times higher than the RMS roughness of the relatively low roughness length section, determined in accordance to ISO 4287/1. The RMS value is determined as the numerical value.

If the unbonded flexible pipe is a riser, the riser preferably comprises at least one relatively high roughness length section in an upper end of the riser, where the upper end is the part of the riser starting from an end fitting adapted to be connected to a sea surface structure e.g. a platform or a ship and extending downwards in up to about 25% of the length of the riser. In a preferred embodiment the riser has at least one relatively high roughness length section of at least about 5 m in length within a distance of about 50 m from an end fitting of the riser adapted to be connected to a sea surface structure e.g. a platform or a ship.

In order to provide that the flow resistance against flow of a fluid (also merely called "flow resistance") in the bore of the unbonded flexible pipe the inner surface of the profiled elongate element(s) which is the surface facing the bore and providing a part of the quasi fluid permeable inner wall, may have edges which are rounded. Additionally, it has been found that by providing the edges of the profiled elongate element(s) with rounding with different rounding diameters the flow resistance can be even further reduced compared to the flow resistance in traditional rough bore unbonded flexible pipes.

In one embodiment where the at least one profiled elongate element has an inner surface facing the bore and a first and a second edges on either side of its inner surface along the length of the elongate element, the first and a second edges each has a rounding with a rounding diameter, wherein the rounding diameter of the first edge is larger than the rounding diameter of the second edge. The larger rounding diameter the sharper is the edge. The profiled elongate element(s) is preferably arranged such that the fluid flow direction is such that the fluid crosses the inner surface of the profiled elongate element from the first to the second edge.

In one embodiment the rounding diameter of the first edge is at least about 50%, such as about 75% larger than the rounding diameter of the second edge.

In one embodiment the rounding diameter of the second edge is about 1 cm or less, such as about 5 mm or less, such as about 3 mm or less, such as about 2 mm or less, such as down to about 0.5 mm.

In one embodiment the rounding diameter of the second edge is about 2 mm or more, such as about 3 mm or more, such as about 5 mm or more, such as about 1 cm or more.

The rounding diameter of the first edge may for example be from about 3 mm to about 50 mm, such as from about 5 mm to about 30 mm.

In one embodiment the rounding diameter of the first edge is at least about 3 mm larger than the rounding diameter of the second edge, such as at least about 5 mm larger than the rounding diameter of the second edge, such as at least about 10 mm larger than the rounding diameter of the second edge, such as at least about 20 mm larger than the rounding diameter of the second edge, The rounding of the first and second edges of the inner surface of the profiled elongate element provides corresponding rounding of the first and second edges of the inner surface of each of the elongate element windings.

The part of the rounding of the first and second edges of the elongate element windings which are facing the bore, is calculated to be a part of the respectively discontinuities.

The discontinuities may have different or equal depth. The depth of a discontinuity will usually be varying over its width, for example due to rounding of the edges of the inner surface of the elongate element windings adjacent to the discontinuity.

In one embodiment a plurality of the discontinuities, such as at least about half or even all of the discontinuities have depths which are substantially equal to the axial thickness of the carcass. I most situations the discontinuities will have a depth which are less than the axial thickness of the carcass, such as at less 10% less than the axial thickness of the carcass.

In one embodiment a plurality of the discontinuities, such as at least about half or even all of the discontinuities have depths which are less than the axial thickness of the carcass, such as about 50% of the axial thickness of the carcass or less.

It has been found that the depth of the discontinuities as such is not important for the risk of forming vortices provided that the gab between the adjacent elongate element windings in the whole depth of the discontinuities is not larger than the discontinuities themselves. However, if the gab between the adjacent elongate element windings in the whole depth of the discontinuities is larger than the discontinuities themselves, this volume—between adjacent elongate element windings—defined as the resonance volume may have influence on the risk of forming or increasing vortices.

The distances between the adjacent elongate element windings along the axial direction is also referred to as parallel shifted widths of the discontinuity in question. These parallel shifted widths of a discontinuity are constant when the gab between the adjacent elongate element windings in the whole depth of the discontinuity is constant. In one embodiment the parallel shifted widths of a discontinuity vary along the depth of the discontinuity.

The resonance volume is defined as the volume provided in one turn, between successive turns of wound elongate element(s) from the quasi fluid permeable inner wall of the bore to a depth P in radial direction of the respective discontinuity. A possibly volume provided between successive elongate element windings at a depth from p and below in radial direction of the respective discontinuity has substantially no influence. The depth P depends on the flow velocity of the fluid in the bore as well as the size of the discontinuities. However, in practice the value P can be set to about 10 mm.

In one embodiment depth P in radial direction of the respective discontinuity, is set to be 10 mm and a plurality of the discontinuities, preferably all of the discontinuities have a resonance volume of d-inner wall (mm)*$\pi$*P(mm)*10(mm) or less. In other words the plurality of the discontinuities or all of the discontinuities has a resonance volume of d-inner wall determined in mm*314 mm$^3$·d-inner wall is the diameter of the quasi fluid permeable inner wall.

In one embodiment depth P in radial direction of the respective discontinuity, is set to be 10 mm and a plurality of the discontinuities, preferably all of the discontinuities have a resonance volume of d-inner wall(mm)*$\pi$*P(mm)*8(mm) or less, such as d-inner wall(mm)*$\pi$*P(mm)*6(mm) or less, such as d-inner wall(mm)*$\pi$*P(mm)*4(mm) or less.

It has been found that if the resonance volume of the discontinuities is too large, such as above d-inner wall*400 mm$^3$, in particular above d-inner wall*500 mm$^3$, this resonance volume of the discontinuities may amplify all ready formed vortices.

In one embodiment the discontinuities each has a depth and a parallel shifted width, which is the width of the discontinuities in axial direction of the pipe, parallel shifted from the quasi fluid permeable inner wall of the bore to a depth of the respective discontinuity of about 1 cm, wherein a plurality of the discontinuities have a parallel shifted width which is up to about twice the width of the discontinuities in axial direction of the pipe.

In one embodiment the carcass consists essentially of the profiled elongate elements.

In one embodiment the carcass consists essentially of the profiled elongate elements and one or more non-armoring elements, such as a sensor arrangement and/or an elastic element. Such sensor arrangement and/or elastic elements and their incorporation in wound profiled elongate elements are well known to a skilled person.

The profiled elongate element(s) is/are may be of any material or combination of materials with a sufficient strength. In one embodiment the profiled elongate element(s) is/are of metal optionally coated with a polymer material. The metal may for example be aluminum and/or steel, preferably duplex steel.

Examples of suitable materials are described in any one of U.S. Pat. No. 5,213,637, U.S. Pat. No. 5,407,744, U.S. Pat. No. 5,922,149, U.S. Pat. No. 6,282,933, U.S. Pat. No. 6,291,079, U.S. Pat. No. 6,408,891, U.S. Pat. No. 6,904,939, U.S. Pat. No. 7,459,033 and WO 06097112.

The inner sealing sheath may be of any polymer material which is sufficiently liquid tight and in particular selected from the materials which in the prior art are known to be used for production of inner sealing sheaths of unbonded flexible pipes. In one embodiment the inner sealing sheath is an extruded polymer sheath.

In one embodiment the unbonded flexible pipe comprises a wound elongate protection element arranged between the inner sealing sheath and the carcass. The wound elongate protection element may for example be of a thermoplastic polymer and may preferably be wound with intervals in the axial direction between windings of the wound elongate protection element.

The wound elongate protection element provides a protection of the inner sealing sheath, such that it is not entrapped in interstices, such as discontinuities in the opposite side of the carcass facing the inner sealing sheath.

The wound elongate protection element of a thermoplastic polymer and wound with intervals in the axial direction between windings of the wound elongate protection element protects the inner sealing sheath to avoid or reduce the risk of being damaged by interstices in the carcass facing towards the inner sealing sheath when the pipe is subjected repeatedly to bending and unbending.

The wound elongate protection element may for example be a tape, preferably with a thickness of about 1 mm or less.

In one embodiment the wound elongate protection element is wound with touching or overlapping windings. In this embodiment it is desired that the tape preferably is of a thermoset polymer and/or or a metal.

The wound elongate protection element of a film provides at least a partial protection against penetration of gasses from the bore into and through the inner sealing sheath. Further the film may provide an at least partial protection of the inner sealing sheath from damage by interstices in the carcass facing towards the inner sealing sheath when the pipe is subjected repeatedly to bending and unbending.

If the tape is a metal tape, the metal is preferably selected to have an electro potential which is substantially identical to the electro potential of the material of the profiled elongate elements of the carcass.

The material of the profiled elongate elements of the carcass should preferably be more noble or equally noble to the metal tape. In other words, the material of the film should preferably be of a material which is more electronegative than or have a similar electro negativity as the material of the profiled elongate elements.

In one embodiment the unbonded flexible pipe comprises at least one sacrificial metal anode within its bore, for example arranged in a cavity of a profiled elongate element, and with substantially no reinforcement function.

The metal of the sacrificial metal anode may in principle be any metal since it is the relative electro negativity which is relevant. Examples of useful sacrificial metal anode include but are not limited to zinc, steel, aluminum, titanium, tantalum, zirconium, niobium, platinum, cobalt, tin, nickel and alloys comprising one or more of zinc, steel, aluminum, titanium, tantalum, zirconium, niobium, platinum, cobalt, tin and nickel.

The unbonded flexible pipe of the invention is preferably a riser.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the inventions including ranges and preferred ranges can be combined in various ways within the scope of the invention, unless there is specific reasons for nor to combine such features.

Further scope of applicability of the present invention will become apparent from the detailed description given hereinafter. However, it should be understood that the description of drawings and examples, while indicating preferred embodiments of the invention, are given by way of illustration only, as various changes and modifications within the spirit and scope of the invention will become apparent to those skilled in the art from this detailed description.

EXAMPLES AND DESCRIPTION OF DRAWINGS

The invention will be explained more fully below in connection with examples and with reference to the drawings.

The figures are schematic and simplified for clarity, and they just show details which are essential to the understanding of the invention, while other details are left out. Throughout, the same reference numerals are used for identical or corresponding parts.

Figure 1:
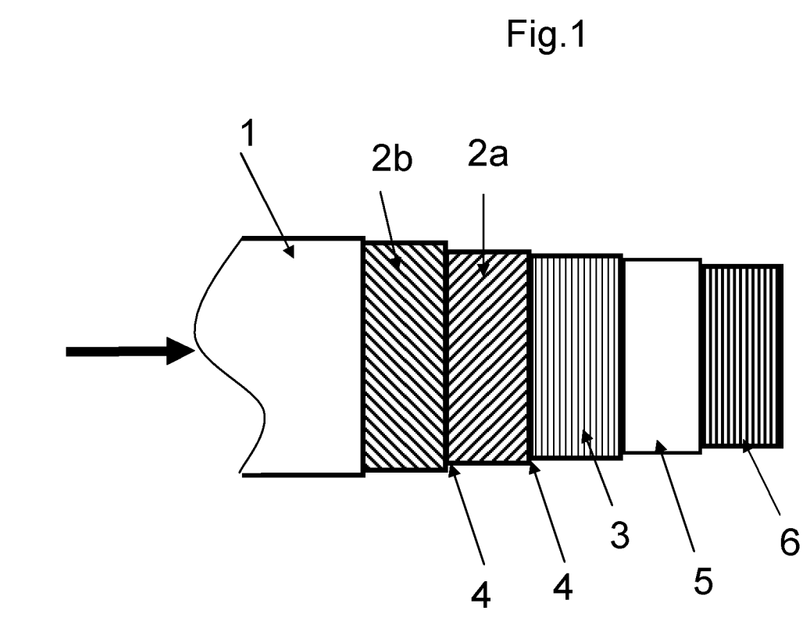
FIG. 1 is a schematic side view of a flexible unbonded pipe of the invention.

The flexible pipe shown in FIG. 1 comprises an inner sealing sheath 5, often also called an inner liner, e.g. of high density poly ethylene (HDPE) cross linked polyethylene (PEX), Polyvinyldifluorid (PVDF) or polyamide (PA). The inner sealing sheath has the purpose of preventing outflow of the fluid transferred in the bore of the pipe, indicated with the arrow. Inside the inner sealing sheath 5 the pipe comprises an inner armouring layer 6, called a carcass which is normally of metal, and has the main purpose of reinforcing the pipe against collapse as described above. The carcass 6 is not liquid tight. On the outer side of the inner sealing sheath 5, the flexible pipe comprises a pressure armouring layer 3 which is often of helically wound armouring element(s) of metal or composite material, which is wound with an angle to the axis of the pipe of about 65 degrees or more e. about 85 degrees. The pressure armouring layer 3 is not liquid tight.

Outside the pressure armouring layer 3, the pipe comprises two cross wound tensile armouring layers 2a, 2b wound from elongate armoring elements. The elongate armoring elements on the innermost tensile armouring layer 2a is wound with a winding degree of about 55 degrees or less to the axis of the pipe in a first winding direction and the outermost tensile armouring layer 2b is wound with a winding degree of about 60 degrees or less, such as between about 20 and about 55 degrees to the axis of the pipe in a second winding direction which is the opposite direction to the first winding direction. This two armouring layers with such opposite winding direction are normally referred to as being cross wound. The pipe further comprises an outer sealing sheath 1 protecting the armouring layer mechanically and against ingress of sea water. As indicated with the reference number 4, the unbonded flexible pipe preferably comprises anti-friction layers between the armoring layers 3, 2a, 2b. The anti-friction layers are not liquid tight, and may for example be in the form of a wound film.

Figure 2:
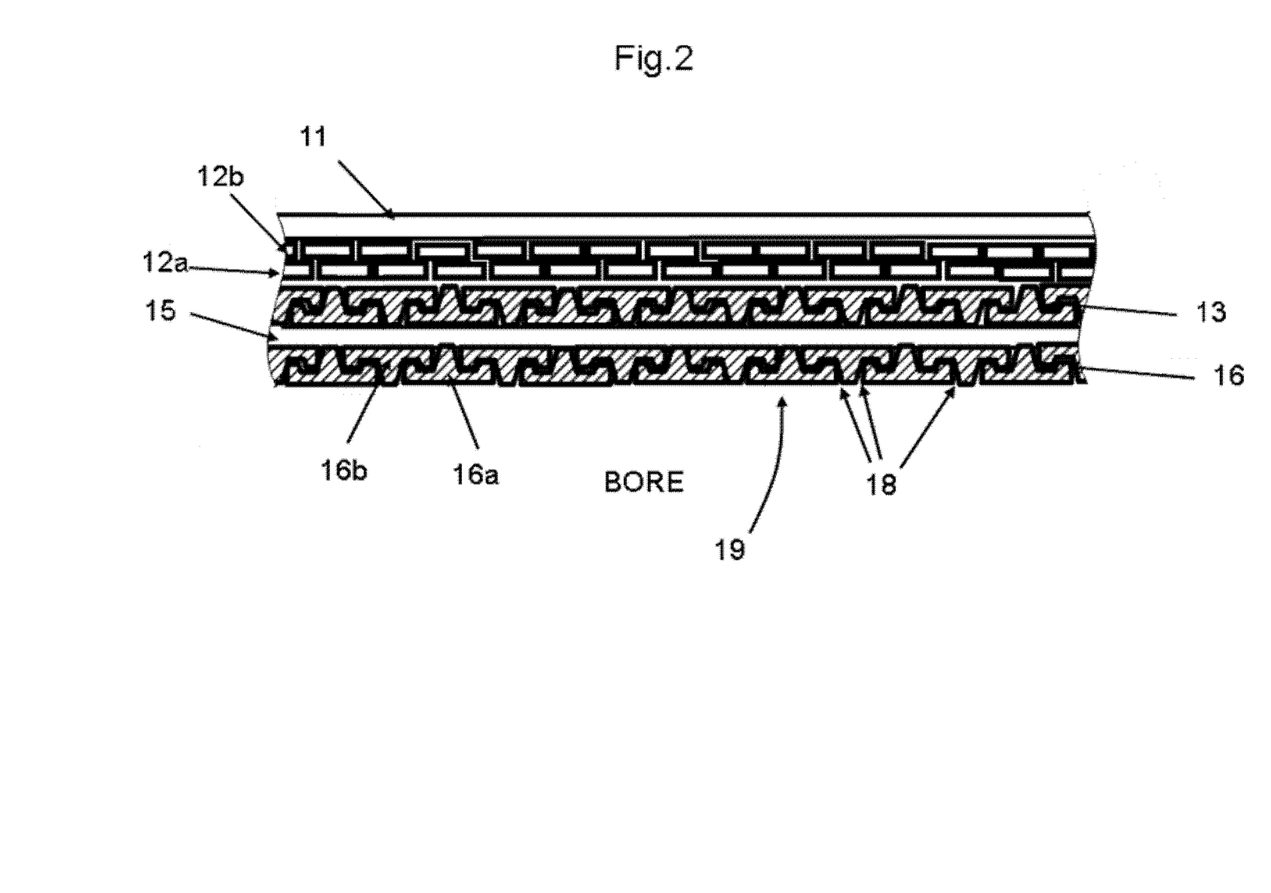
FIG. 2 is a cross-sectional view of along the length of a flexible pipe of the invention where the layers of the pipe can be seen.

In FIG. 2 an example of an unbonded flexible pipe of the invention with layers as in FIG. 1 is shown.

The unbonded flexible pipe of the invention comprises from inside and outwards a carcass 16, an inner sealing sheath 15, a pressure armouring layer 13, two cross wound tensile armouring layers 12a, 12b and an outer an outer sealing sheath 11.

The carcass 16 is made from profiled elongate elements 16a, 16b with a profile shaped as a T, where at least two T-shaped profiled elongate elements 16a, 16b are wound, such that they are turned in opposite direction to each other and are engaged in each other.

T-shaped profiled elongate elements 16a, 16b are helically wound to provide elongate element windings along the length of the pipe, such that the elongate element windings engage with adjacent elongate element windings.

In the shown embodiment the pressure armoring layer 13 is made from profiled elongate elements similar to the profiled elongate element 16a, 16b of the carcass. It should be understood that the pressure armoring layer 13 could be provided in any other way and from any other elongate elements for example such that it is known from prior art pressure armoring layers.

In the following examples only the carcass structure of the unbonded flexible pipe will be discussed. Other layers of the unbonded flexible pip, including sealing layers and armor layers on the outer side of the inner sealing sheath, may for example be as in the prior art, in Specification for Unbonded Flexible Pipe, API, 17J, Third edition, July 2008 and/or in Recommended Practice for Flexible Pipe, API, 17B, Fourth edition, July 2008.

Figure 3A:
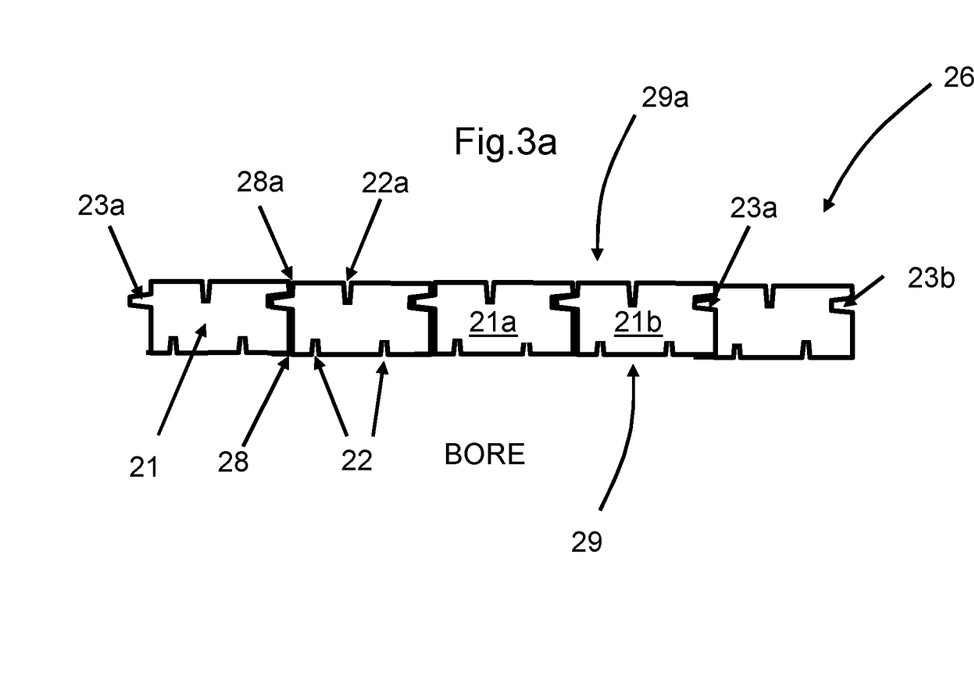
FIG. 3a is a cross-sectional view of a first carcass, where the cross-sectional cut is taken in cross-section of the profiled elongate element.

In FIG. 3a a carcass 26 provided from one type of profiled elongate element(s) 21 is shown. The drawing illustrates cross-sectional side view taken in cross-section of the profiled elongate element(s) 21 of the carcass 26. The carcass 26 may comprise several profiled elongate elements 21, but it may also be made from one single profiled elongate element 21. If only one profiled elongate element 21 is used the winding degree with respect to the axis of the pipe will be very high which makes the resulting carcass very strong against collapse from pressure from the outer side of the inner sealing sheath. On the other hand, if using two or more profiled elongate elements 21 wound in side-by-side relation, the winding degree with respect to the axis of the pipe will be lower than when using only one profiled elongate element 21. However, if only a few profiled elongate elements 21, such as 2 or 3 profiled elongate elements 21 wound in side-by-side relation, any possibly reduction in collapse will normally be very small. Since such profiled elongate elements are produced in limited lengths, e.g. lengths of 1 km, the profiled elongate elements often needs to be welded to be sufficiently long to produce the whole length of the unbonded flexible pipe, which may be up to several km long. Therefore it may be beneficial to use more than one profiled elongate element 21 wound in side-by-side relation because the number of welding therefore can be reduced compared to when only one profiled elongate element 21 is used. In most situations 1-5 profiled elongate elements 21 wound in side-by-side relation will be used.

The at least one profiled elongate element 21, is helically wound to provide elongate element windings 21a, 21b along the length of the pipe, where the profile of the elongate element 21 comprises a first side with a protruding tongue 23a and a second side with a recess 23b corresponding in shape to the protruding tongue 23a such that the elongate element windings 21a, 21b engage directly with adjacent elongate element windings 21a, 21b. The elongate element windings 21a, 21b engage with adjacent elongate element windings 21a, 21b in a direction substantially perpendicular to radial direction, to thereby reduce or prevent radial displacement of the elongate element windings 21a, 21b relative to adjacent elongate element windings 21a, 21b.

The elongate element 21 is helically wound to provide a quasi fluid permeable inner wall 29 of the bore with discontinuities 28 between successive turns (elongate element windings 21a, 21b) of the wound elongate element 21. The discontinuities 28 have an average width in the axial direction of the pipe which is about 3 mm or less when the pipe is in an unloaded and unbent condition, and the number of discontinuities is sufficient to allow the pipe to bend with a minimum bending radius (NBR) of about 10 m or less, when the pipe is in an unloaded condition.

On its outer side 29a the carcass 26 comprises outer discontinuities 28a provided between successive turns of the wound elongate element 21.

The quasi fluid permeable inner wall 29 of the bore is essentially smooth, except for the discontinuities 28 between successive turns of the wound elongate element 21 and a number of cavities 22. Similar cavities 22a are placed on the outer side 29a of the carcass 26.

Figure 3B:
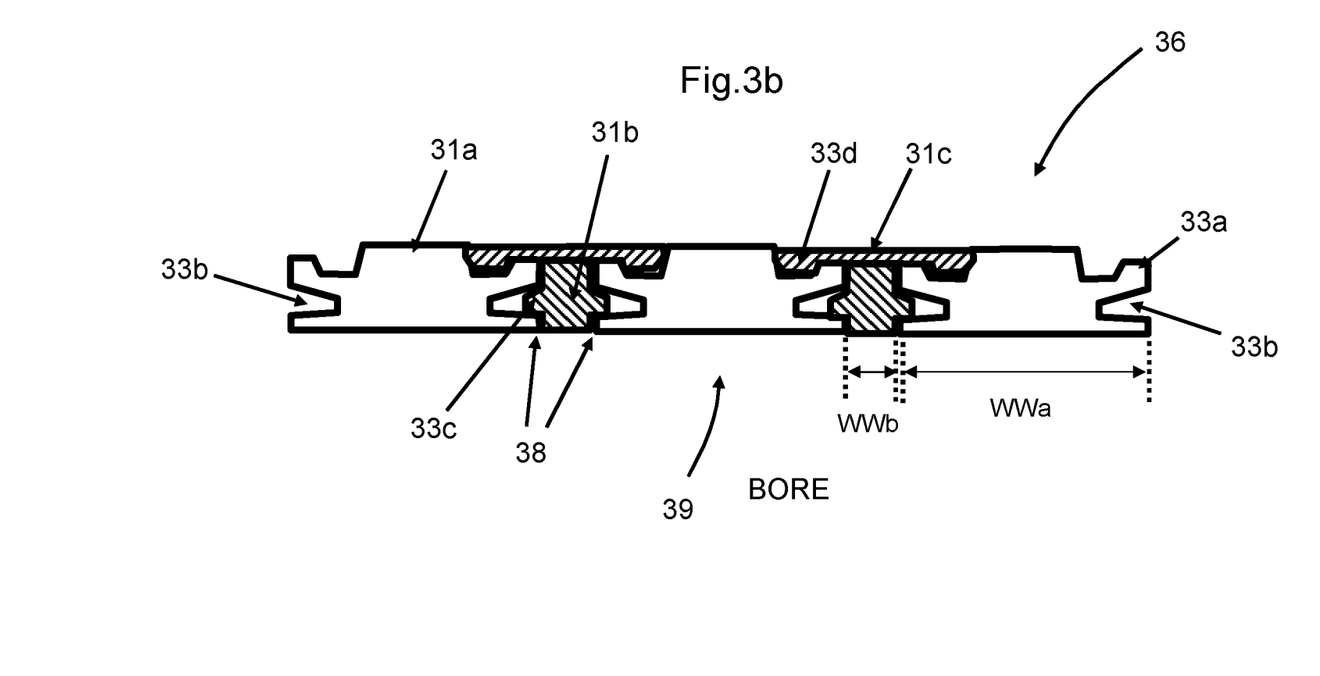
FIG. 3b is a cross-sectional view of a second carcass, where the cross-sectional cut is taken in cross-section of the profiled elongate elements.

FIG. 3b is an illustration of another carcass 36 provided from several types of profiled elongate elements 31a, 31b, 31c. The drawing illustrates cross-sectional side view taken in cross-section of the profiled elongate elements 31a, 31b, 31c of the carcass 36.

The profiled elongate elements 31a, 31b, 31c are helically wound to provide elongate element windings along the length of the pipe. The carcass 36 has 3 types of profiled elongate elements 31a, 31b, 31c with different profile and optionally of different materials. The profiled elongate elements 31a, 31b, 31c are each substantially symmetrical in a symmetry plane perpendicular to the cross section of the respective profiled elongate elements 31a, 31b, 31c. As described herein the rounding of edges proximately to the quasi fluid permeable inner wall 39 may beneficially be different.

The first profiled elongate element 31a, which is preferably of metal e.g. steel is shaped with a K profile e.g. as described in U.S. Pat. No. 6,739,355 and comprises recess' 33b and radial protruding parts 33a. The second profiled elongate element 31b, which may be of metal or of polymer, is shaped with a + profile and comprises protruding parts 33c which are engaged with the recess' 33b of the first profiled elongate element 31a of adjacent elongate element windings. This engagement is in a direction substantially perpendicular to radial direction. The third profiled elongate element 31c, which may be of metal or of polymer, is shaped with a C profile e.g. as described in U.S. Pat. No. 6,739,355 and comprises radial protruding parts 33d, which are engaged with the radial protruding parts 33a of the first profiled elongate element 31a of adjacent elongate element windings. This engagement is in a substantially radial direction.

The profiled elongate elements 31a, 31b, 31c are helically wound to provide a quasi fluid permeable inner wall 39 of the bore with discontinuities 38 between successive turns of the wound profiled elongate elements 31a, 31b, 31c. The discontinuities 38 have a width DW in the axial direction. The first profiled elongate element 31a and the second profiled elongate element 31b each has a width WWa, WWb in axial direction.

The discontinuities 38 preferably have width DW in the axial direction of the pipe which relative to a width WW of the widest of the immediately adjacent elongate elements, which is here the width WW1 of the first profiled elongate element 31a, which $$WW/DW > X, \text{ Where } X \text{ is about 3 or larger.}$$

Figures 4A, 4B:
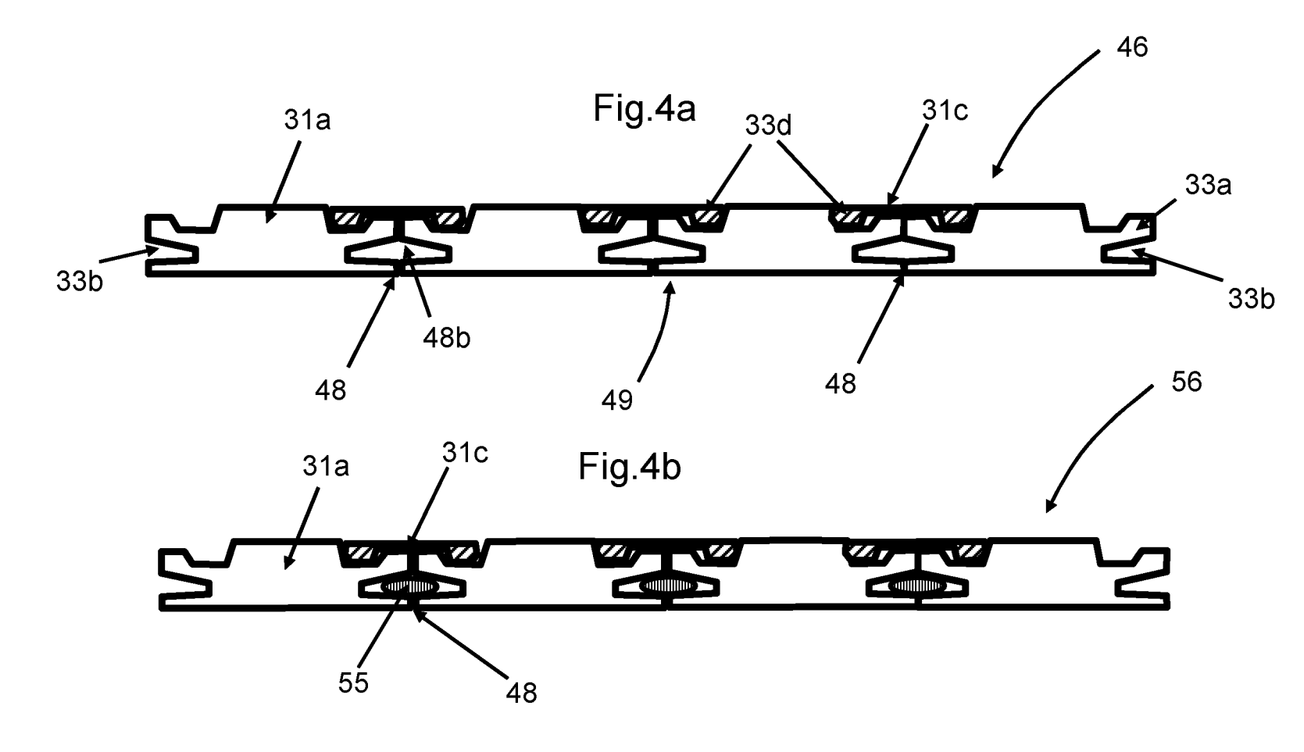
FIG. 4a is a cross-sectional view of a variation of the third carcass, where the cross-sectional cut is taken in cross-section of the profiled elongate element.
FIG. 4b is a cross-sectional view of a variation of the third carcass, where the cross-sectional cut is taken in cross-section of the profiled elongate element.

FIG. 4a is an illustration of another carcass 46 which is a variation of the carcass shown in FIG. 3b. The carcass 46 is provided from two types of profiled elongate elements 31a, 31c, which are similar to the profiled elongate elements 31a, 31c of FIG. 3b, with the difference that the C-shaped profiled elongate element 31c has a shorter distance between its radial protruding parts 33d in order to engage with the K-shaped profiled elongate element 31a to hold adjacent windings of the K-shaped profiled elongate element 31a close to each other such that the discontinuities 48 is kept small as desired.

The K-shaped profiled elongate element 31a is accordingly helically wound to provide a quasi fluid permeable inner wall 49 of the bore with discontinuities 48 between successive turns of the wound K-shaped profiled elongate element 31a. The recess' 33b of adjacent windings thereby form a volume 48b in direct connection with the discontinuities 48. This volume 48b is referred to as a potential resonance volume 48b of the discontinuity 48 it is in connection with. The depth of the discontinuities 48 is determined from the quasi fluid permeable inner wall 49. In the shown carcass 46 the potential resonance volumes 48b of the discontinuities 48 are placed relatively close to the quasi fluid permeable inner wall 49. If for example the radial thickness of the K-shaped profiled elongate element 31a is about 2 cm and the resonance depth P is about 10 mm, the whole volume of the potential resonance volumes 48b of the discontinuities 48 may function as actual resonance volumes which may have an amplifying effect on vortices.

The carcass 56 shown in FIG. 4b is similar to the carcass shown in FIG. 4a with the difference that a locking element 55 is arranged in the potential resonance volumes 48b. Such locking element is for example described in U.S. Pat. No. 6,739,355. The locking element 55 block the free connection between the potential resonance volumes 48b and the discontinuities 48, such that the potential resonance volumes 48b no longer forms part of actual resonance volumes, and thereby any risk of formation of vortices are reduced.

Figure 5A:
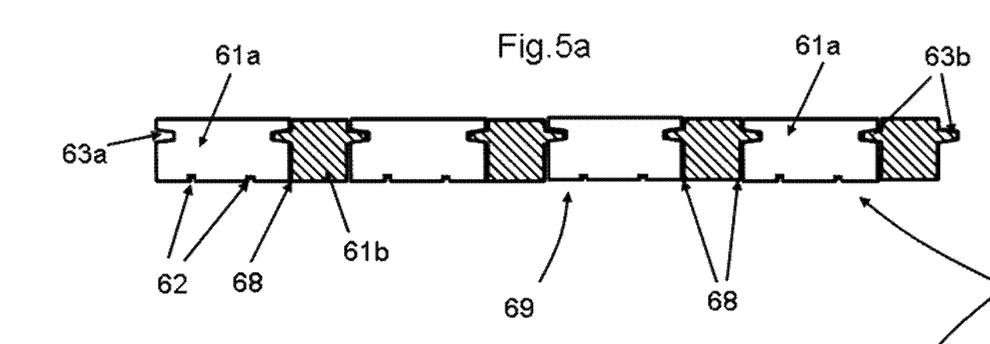
FIGS. 5a and 5b are cross-sectional views of a fourth carcass, where the cross-sectional cut is taken in cross-section of the profiled elongate element.
Figure 5B:
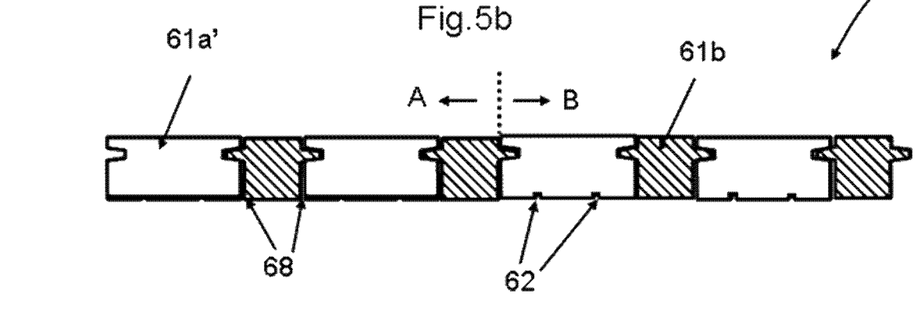

FIGS. 5a and 5b illustrates another carcass 66 provided from several types of profiled elongate elements 61a, 61a', 61b. The drawing illustrates cross-sectional side view taken in cross-section of the profiled elongate elements 61a, 61a', 61b of the carcass 66.

The carcass 66 has a first profiled elongate element 61a, 61a', which is preferably of metal e.g. steel and which is shaped with a mainly rectangular shape with recess' 63a. In a length part the first profiled elongate element 61a further comprises cavities 62 or similar. In another length part the first profiled elongate element 61a' is substantially free of such roughness increasing tops and/or cavities.

The carcass 66 further has a second profiled elongate element 61b, e.g. of metal or polymer and shaped as a + shaped profile and comprises protruding parts 63b which are engaged with the recess' 63a of the first profiled elongate element 61a, 61a' of adjacent elongate element windings.

The profiled elongate elements 61a, 61a', 61b are helically wound to provide a quasi fluid permeable inner wall 69 of the bore with discontinuities 68 between successive turns of the wound profiled elongate elements 61a, 61a', 61b.

Figure 6A:
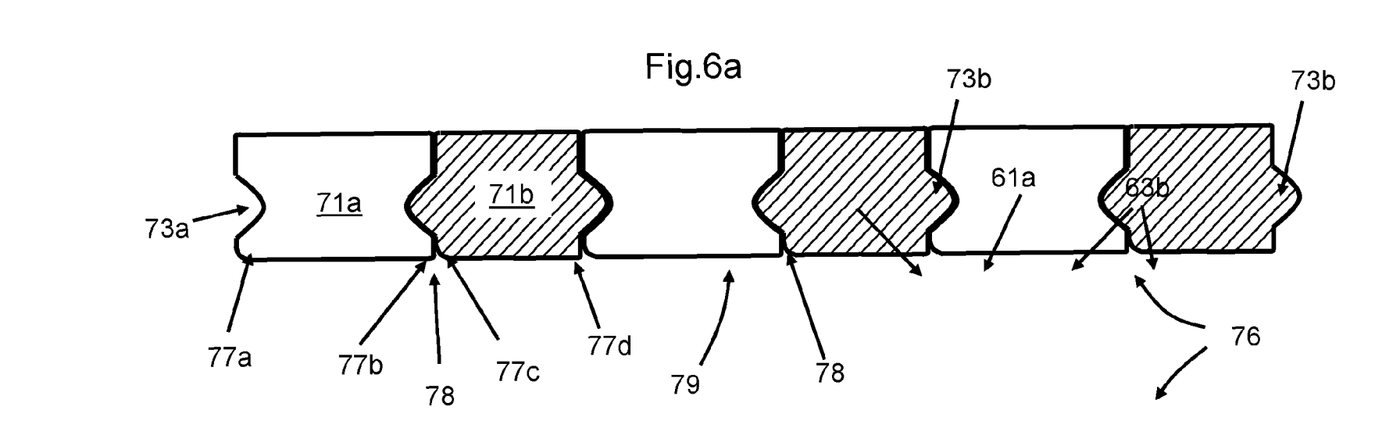
FIGS. 6a and 6b are cross-sectional views of a fourth carcass, where the cross-sectional cut is taken in cross-section of the profiled elongate element.
Figure 6B:
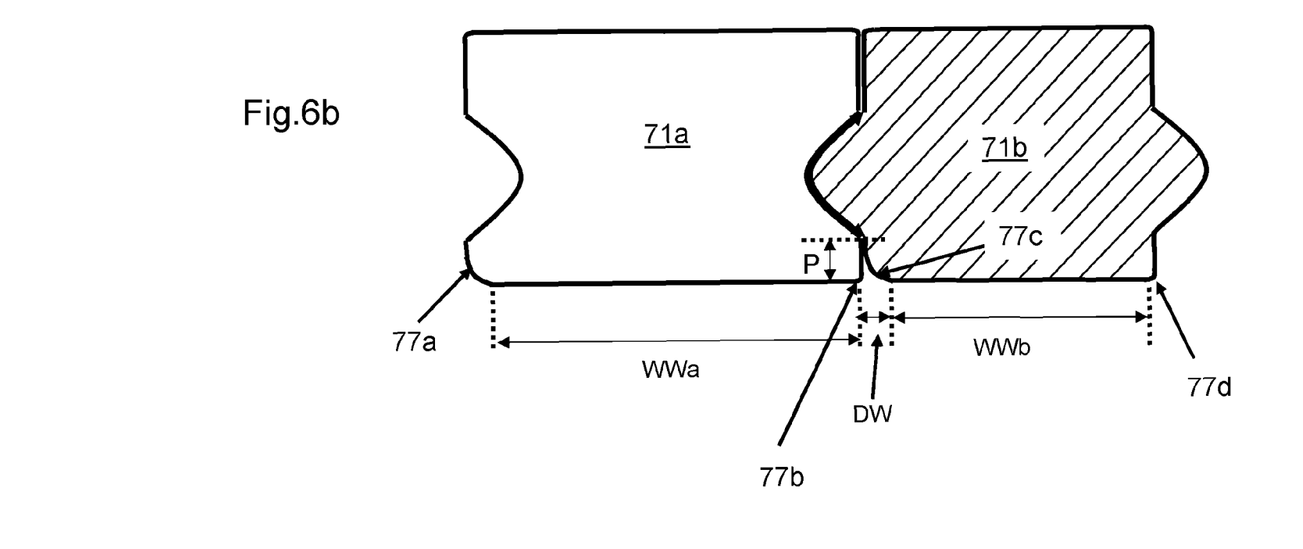

The unbonded flexible pipe has at least one relatively high roughness length section—indicated with "A" in FIG. 5b—and at least one relatively low roughness length section—indicated with "B" in FIG. 5b FIGS. 6a and 6b illustrates another carcass 76 provided from several types of profiled elongate elements 71a, 71b. The drawing illustrates cross-sectional side view taken in cross-section of the profiled elongate elements 71a, 71b of the carcass 76.

The carcass 76 has a first profiled elongate element 71a, which is preferably of metal e.g. steel and which is shaped with a mainly rectangular shape with recess' 73a. The carcass 76 further has a second profiled elongate element 71b which is of metal or polymer and which is shaped with a mainly rectangular shape with protruding parts 73b which are engaged with the recess' 73a of the first profiled elongate element 71a in adjacent elongate element windings.

The profiled elongate elements 71a, 71b are helically wound to provide a quasi fluid permeable inner wall 79 of the bore with discontinuities 78 between successive turns of the wound profiled elongate elements 71a, 71b.

Each of the profiled elongate elements 71a, 71b has an inner surface facing the bore and which together with the discontinuities 78 between adjacent windings of the profiled elongate elements 71a, 71b form the quasi fluid permeable inner wall 79. The inner surfaces facing the bore of the profiled elongate elements 71a, 71b each has a width WWa, WWb and a first and a second edges 77a, 77b, 77c, 77d on either side of its inner surface along the length of the elongate element in question. The first and second edges 77a, 77b, 77c, 77d each has a rounding with a rounding diameter, wherein the rounding diameter of the first edge 77a, 77c is larger than the rounding diameter of the second edge 77b, 77d. In the shown embodiment the rounding diameter of the first edge 77a of the first profiled elongate element 71a is similar or identical to the rounding diameter of the first edge 77c of the second profiled elongate element 71b, and the rounding diameter of the second edge 77b of the first profiled elongate element 71a is similar or identical to the rounding diameter of the second edge 77d of the second profiled elongate element 71b. In a not shown variation the first and a second edges of one profiled elongate element differs from the first and a second edges of another profiled elongate element.

The discontinuities 78 have a width DW in the axial direction. As shown the rounding of the first and second edges do not form part of the respective width WWa, WWb of the profiled elongate elements 71a, 71b, but the part of the rounding of the first and second edges form part of the discontinuities 78.

The depth P of the discontinuities 79 extend in radial direction from the quasi fluid permeable inner wall 79 to the point of engagement.

What is claimed is:

1. An unbonded flexible pipe for the transportation of fluids, the pipe has a length and comprises a tubular inner sealing sheath defining a bore with a center axis along the length of the pipe, at least one armor layer surrounding the inner sealing sheath and a carcass arranged in said bore and supporting the inner sealing sheath, said carcass is the innermost layer of the pipe and comprises at least one profiled elongate element, helically wound to provide elongate element windings along the length of the pipe, the profile of the at least one elongate element is such that the elongate element windings engage with adjacent elongate element windings directly and/or indirectly, the elongate element(s) being helically wound with a winding angle to the center axis of at least about 80 degrees, thereby providing a quasi fluid permeable inner wall of the bore with discontinuities between successive turns of the wound elongate element(s), wherein said discontinuities have an average width in the axial direction of the pipe which is about 3 mm or less when the pipe is in an unloaded and unbent condition, and where the number of discontinuities is sufficient to allow the pipe to bend with a minimum bending radius of about 10 m or less, when the pipe is in an unloaded condition, and wherein the discontinuities along the length of the pipe allow the pipe to bend with a minimum bending radius which is smaller in one length section of the pipe than in another length section of the pipe.

2. The unbonded flexible pipe as claimed in claim 1, wherein a plurality of the discontinuities each has a width DW in the axial direction of the pipe which relative to a width WW of the widest of the immediately adjacent elongate element(s) in axial direction fulfill the formula $$WW/DW > X,$$

where X is about 3 or larger.

3. The unbonded flexible pipe as claimed in claim 1, wherein a plurality of the discontinuities each has a width DW in the axial direction of the pipe which relative to a width WW of the widest of the immediately adjacent elongate element(s) in axial direction fulfill the formula $$WW/DW > X,$$

where X is between about 3 and about 20.

4. The unbonded flexible pipe as claimed in claim 1, wherein the quasi fluid permeable inner wall of the bore for a plurality elongate element windings along the length of the pipe with an elongate element winding width WW1 in axial direction of the pipe comprises at least one discontinuity with a width DW1 in the axial direction of the pipe fulfill the formula $$WW1/DW1 > X1,$$

where X1 is between about 3 and about 12.

5. The unbonded flexible pipe as claimed in claim 4, wherein the at least one discontinuity with a width DW 1 in the axial direction of the pipe is immediately adjacent to the elongate element windings along the length of the pipe with the width WW1 in axial direction of the pipe.

6. The unbonded flexible pipe as claimed in claim 1, wherein the number of discontinuities is sufficient to allow the pipe to bend with a minimum bending radius of about 8 m or less when the pipe is in an unloaded condition.

7. The unbonded flexible pipe as claimed in claim 1, wherein substantially all of the discontinuities have a width in the axial direction of the pipe which is about 3 mm or less when the pipe is in an unloaded and unbent condition.

8. The unbonded flexible pipe as claimed in claim 1, wherein the elongate element windings engage with adjacent elongate element windings in a direction substantially perpendicular to radial direction, to thereby reduce or prevent radial displacement of the elongate element windings relative to adjacent elongate element windings.

9. The unbonded flexible pipe as claimed in claim 1, wherein at least some of the elongate element windings do not engage with at least one adjacent elongate element winding in a substantially radial direction.

10. The unbonded flexible pipe as claimed in claim 1, wherein at least some of the elongate element windings engage with at least one adjacent elongate element winding in a substantially radial direction.

11. The unbonded flexible pipe as claimed in claim 1, wherein the carcass has an inner side in the form of the quasi fluid permeable inner wall of the bore and an opposite outer side, adjacent elongate element windings are engaged with each other in a substantially radial direction, the engagements in radial direction are placed closer to the quasi fluid permeable inner wall of the bore than to the outer side of the carcass.

12. The unbonded flexible pipe as claimed in claim 1, wherein the quasi fluid permeable inner wall of the bore is essentially smooth except for the discontinuities between successive turns of the wound elongate elements.

13. The unbonded flexible pipe as claimed in claim 1, wherein the quasi fluid permeable inner wall of the bore is essentially smooth except for the discontinuities between successive turns of the wound elongate elements and sound damping tops and/or cavities with a width in the axial direction of the pipe which is about 2 mm or less.

14. The unbonded flexible pipe as claimed in claim 1, wherein the carcass comprises at least one profiled elongate element with a thickness in the radial direction of the pipe and an inner surface facing the bore, the inner surface comprises a plurality of cavities with a depth of up to about 50% of the thickness of the elongate element or the inner surface comprises a plurality of tops with a height of about 2 mm or less.

15. The unbonded flexible pipe as claimed in claim 1, wherein the carcass comprises at least one profiled elongate element with an inner surface facing the bore, the inner surface comprises a plurality of tops and/or cavities, wherein the distance between tops and/or cavities having a height/depth of 0.5 mm or more is at least about 5 mm.

16. The unbonded flexible pipe as claimed in claim 1, wherein the quasi fluid permeable inner wall of the bore is essentially smooth except for the discontinuities between successive turns of the wound elongate elements and sound damping tops and/or cavities with a width in the axial direction of the pipe which is about 2 mm or less and a height/depth which is about 0.5 mm or more, wherein the unbonded flexible pipe comprises a relatively low roughness length section and a relatively high roughness length section, wherein the relatively high roughness length section comprises more sound damping tops and/or cavities than the relatively low roughness length section.

17. The unbonded flexible pipe as claimed in claim 1, wherein the quasi fluid permeable inner wall of the bore is provided by an inner surface of at least one profiled elongate element and the discontinuities between successive turns of the wound elongate element(s), the unbonded flexible pipe comprises a relatively low roughness length section and a relatively high roughness length section, wherein the relatively high roughness length section has a higher RMS roughness than the RMS roughness of the relatively low roughness length section, determined in accordance to ISO 4287/1.

18. The unbonded flexible pipe as claimed in claim 1, wherein the at least one profiled elongate element has an inner surface facing the bore and a first and a second edges on either side of its inner surface along the length of the elongate element, the first and a second edges each has a rounding with a rounding diameter, wherein the rounding diameter of the first edge is larger than the rounding diameter of the second edge.

19. The unbonded flexible pipe as claimed in claim 1, wherein the at least one profiled elongate element has an inner surface facing the bore and a first and a second edges on either side of its inner surface along the length of the elongate element, the first and a second edges each has a rounding with a rounding diameter, wherein the rounding diameter of the first edge is at least about 3 mm larger than the rounding diameter of the second edge.

20. The unbonded flexible pipe as claimed in claim 1, wherein a plurality of the discontinuities have depths which are substantially equal to the axial thickness of the carcass.

21. The unbonded flexible pipe as claimed in claim 1, wherein a plurality of the discontinuities have depths which are less than the axial thickness of the carcass.

22. The unbonded flexible pipe as claimed in claim 1, wherein the discontinuities each has a resonance volume defined as the volume provided in one turn, between successive turns of wound elongate element(s) from the quasi fluid permeable inner wall of the bore to a depth P in radial direction of the respective discontinuity, wherein P is 10 mm and a plurality of the discontinuities have a resonance volume of d-inner wall (mm)*$\pi$*P(mm)*10(mm) or less.

23. The unbonded flexible pipe as claimed in claim 1, wherein the discontinuities each has a depth and a parallel shifted width, which is the width of the discontinuities in axial direction of the pipe, parallel shifted from the quasi fluid permeable inner wall of the bore to a depth of the respective discontinuity of about 1 cm, wherein a plurality of the discontinuities have a parallel shifted width which is up to about twice the width of the discontinuities in axial direction of the pipe.

24. The unbonded flexible pipe as claimed in claim 1, wherein the carcass consists essentially of said profiled elongate elements and one or more non-armoring elements selected from a sensor arrangement or an elastic element.

* * * * *